United States Patent [19]

Coulaloglou

[11] 4,132,005

[45] Jan. 2, 1979

[54] FLUIDIZATION OF PERMANENTLY MAGNETIC PARTICLE BEDS

[75] Inventor: Costas A. Coulaloglou, Morristown, N.J.

[73] Assignee: Exxon Research & Engineering Co., Florham Park, N.J.

[21] Appl. No.: 821,168

[22] Filed: Aug. 2, 1977

[51] Int. Cl.$^2$ .............................................. F26B 3/10
[52] U.S. Cl. .......................................... 34/10; 34/1; 110/245; 122/4 D; 75/26; 366/101; 422/139
[58] Field of Search ........................... 34/1, 10, 7 A; 23/288 S; 432/15, 58; 110/28 J, 245; 122/4 D; 250/528

[56] References Cited

U.S. PATENT DOCUMENTS

| | | | |
|---|---|---|---|
| 3,439,899 | 4/1969 | Hershler | 259/1 |
| 3,440,731 | 4/1969 | Tuthill | 34/1 |

OTHER PUBLICATIONS

Chemical Engineering Science, 1971, vol. 26, pp. 1293–1294, "Interparticle Forces that Suppress Bubbling in Gas Fluidised Beds".

Primary Examiner—Benjamin R. Padgett
Assistant Examiner—E. Suzanne Parr
Attorney, Agent, or Firm—James H. Callwood

[57] ABSTRACT

A process for the stabilization of a fluidized bed against bubble formation which process comprises a vessel, a plurality of permanently magnetized particles dispersed throughout the bed, and means for fluidizing said particles. The particles are designated as permanently magnetized by virtue of their possessing a coercivity of at least 50 oersteds. The permanently magnetized particles exert magnetic attractive forces upon one another, thereby imparting stability to the fluidized bed. In these beds, fluid throughput rates which are up to 10 or more times the flow rate of said fluid at incipient fluidization of the unmagnetized particles can be achieved with little or no bubbling and at bed pressure drops equal to bed weight.

8 Claims, 6 Drawing Figures

FIGURE 2. DETERMINATION OF THE M-H CURVE OF A TOROIDAL CORE $M = B - H$

FIGURE 1
THE HYSTERESIS LOOP

FIGURE 2. DETERMINATION OF THE M-H CURVE OF A TOROIDAL CORE $M = B - H$

FIGURE 3
DETERMINATION OF THE MAGNETIZATION AND COERCIVITY FOR A SPECIMEN OF FINITE DIMENSIONS $d$: DEMAGNETIZATION COEFFICIENT

FIGURE 4
METHOD OF PARTICLE MAGNETIZATION OF PMB FERROMAGNETIC SOLIDS b
SOLIDS MAGNETIZATION POINT A' c
FIELD IS REDUCED TO ZERO. POINT W' d
SOLIDS IN PMB POINT W

FIGURE 5

RESIDUAL MAGNETIZATION AND COERCIVITY OF SOFT (1%C STEEL) AND HARD (FERRITE, INDOX 5) SPHERICAL PARTICLES

FLUIDIZATION OF PERMANENTLY MAGNETIC PARTICLE BEDS

FIELD OF THE INVENTION

This invention relates to a fluidized bed process. More particularly, the invention is concerned with a fluidized bed process wherein the fluidized bed is made up of permanently magnetized particles which exert sufficient interparticulate magnetic attractive forces upon one another to impart a degree of stability to the fluidized bed which is sufficient to allow the flow rate of the fluidizing means to be increased with essentially no bubble formation to at least twice the transition velocity obtainable when said particles are unmagnetized.

DESCRIPTION OF THE PRIOR ART

Many chemical and physical reactions such as catalytic cracking, hydrogenation, oxidation, reduction, drying, filtering, etc. are carried out in fluidized beds. A fluidized bed briefly consists of a mass of particulate solid material in which the individual particles are in continuous motion relative to one another whereby the mass or fluidized bed possesses the characteristics of a liquid. Like a liquid, it will flow or pour freely. There is hydrostatic head pressure, it seeks a constant level, it will permit the immersion of objects and will support relatively buoyant objects, and in many other properties it acts like a liquid. A fluidized bed is conventionally produced by effecting a flow of a fluid, usually a gas, through a porous or perforated plate underlying the particulate mass, of a sufficient rate to support the individual particles in a relatively continuously moving manner. A minimum air flow is required to produce fluidization and is known as the incipient fluidization and is dependent on many parameters including particle size, particle density, etc. Any increase in the fluid flow beyond incipient fluidization causes large instabilities with bubbling and channeling until the fluid velocity exceeds the free falling velocity of the particles which are then carried out of the apparatus.

Fluidized beds possess many desirable attributes, for example, they can be used in temperature control, heat transfer, catalytic reactions, and various chemical and physical reactions such as oxidation, reduction, drying, polymerization, coating, diffusion, filtering and the like. However, the bubbling nature of fluidized beds causes large deviations from the usually desirable countercurrent plug flow.

Among the problems associated with fluidized beds, a most basic one is that of bubble formation. All gas in excess of minimum fluidization velocity passes through the bed in the form of bubbles. This leads to gas bypassing and frequently results in slugging and channeling. This problem is most common in gas-fluidized systems. The problem necessitates critical flow control and affects design factors such as bed dimensions, bed density, solids and gas mixing, pressure drops, particle sizes, etc. Bubbling causes both chemical and mechanical difficulties: for example, in gas-solids reactions gas bubbles may bypass the particles altogether resulting in lowered contacting efficiency.

Ideally, a fluidized bed should be free of bubbles, homogeneous, maintain particle suspension and manifest noncritical flow velocity control for various bed heights and bed densities. Many procedures and systems have been proposed to effect improvement, for example, by the use of baffles, packing, mechanical vibration and mixing devices, the use of mixed particle sizes, special flow control valves, bed rotation, etc.

More recently, it has been disclosed in U.S. Pat. Nos. 3,304,249; 3,440,731; and 3,439,899 that certain improvements in fluidized beds can be effected by externally applying a magnetic field to a fluidized bed of particulate solids having ferromagnetic properties.

In U.S. Pat. No. 3,439,899, patentee teaches a process for the prevention of bubble formation in fluidized beds by using an externally applied magnetic field in conjunction with a bed of permanent magnets. Patentee found that bed slugging occurs in the absence of a magnetic field when the fluidizing gas velocity was increased from 0.9 ft/sec at incipient fluidization to 1.4 ft/sec. The patentee also utilized alternating current to provide an electromagnetic field to this fluidized bed process.

D. B. Ivanov and coworkers have utilized magnetic fields in conjunction with fluidized bed processes. See, for example, British Pat. No. 1,148,513; *Kinet Katal* 11 No. 5 1214–19, Sept. to October 1970, *Comptos Rendus De L'Academic Bulgare Des Sciences,* Tome 23 No. 7, 1970. These workers used gradient applied magnetic fields to generate body forces to hold fine particles in place and thus permit higher flow rates than in conventional fluidized beds.

In each of the prior art disclosures an essential feature of the invention was an external magnetic field. In each case, the external magnetic field was provided by either a permanent magnet or electromagnet coaxially surrounding the bed and connected to a power source to produce the desired current.

The primary disadvantages associated with prior art magnetically stabilized fluid bed processes, are the expense and inconvenience of providing an electromagnet of sufficient size to surround the reactor, the need to maintain a power source for generating current, and the need in various prior art processes to maintain a magnetic field of a given orientation.

In *Chemical Engineering Science* 1971, Volume 26, 1293–94, Rowe et al observed that bubble formation in a fluidized bed is suppressed in the case where relatively coarse steel shot is magnetized prior to its fluidization. In the case of magnetized steel shot, Rowe et al determined that for particles having a 125 micron diameter there was up to a 12% bed expansion before bubble formation occurred. The data in FIG. 11 of the reference suggests that Rowe et al were able to attain approximately an increase of 1.5 times the velocity of the fluidizing means attainable with unmagnetized particles.

The material used in the Rowe et al disclosure was steel shot, a soft material from the point of view of magnetization; i.e. a material which, though it is characterized by being easily magnetized, has low coercivity, resulting in low particle magnetization. Also, due to its low coercivity a soft magnetic material is very easily demagnetized by application of a relatively weak field in the opposite direction. With reference to the demagnetization tendency of steel, the *Handbook of Chemistry and Physics,* 47th Edition, 1966–1967, published by the Chemical Rubber Company, lists steel as having coercivity of less than 50 oersteds.

In accordance with the present invention, it has been found that unusually high fluidizing gas velocities can be used without significant bubbling or slugging in a fluidized bed containing permanently magnetized particles having a coercivity of at least 50 oersteds. For example, with the use of the permanently magnetized particles of the present invention, it is possible to operate a fluidized bed without significant bubbling or slugging therein at a superficial gas velocity of 2 to 10 or more times the minimum superficial gas velocity of the nonmagnetized particles.

SUMMARY OF THE INVENTION

A fluidized bed apparatus comprising a vessel containing a bed of fluidizable permanently magnetized particles having a coercivity of at least 50 oersteds and means for fluidizing said particles. As indicated, the use of such permanently magnetized particles imparts a degree of stability to the fluidized bed which allows the flow rate of the fluidizing gas to be increased to at least twice the gas velocity which could be employed under essentially nonbubbling conditions with particles not having the magnetic properties of the particles claimed herein.

A number of particle characteristics account for the degree of stability which will be exhibited by a fluidized bed of permanently magnetized particles. Among these particle characteristics are average particle diameter, particle density, viscosity of the fluidizing medium and particle magnetization. Of these characteristics, particle magnetization contributes most strongly to imparting stability to a fluidized bed of permanently magnetized particles. Particle magnetization, in turn, is most strongly affected by the coercivity of the material.

Particle magnetization is a measure of the combined effect of remanence, i.e. residual magnetization and coercivity, i.e. tendency of a material to retain its residual magnetization. Of these two factors, coercivity contributes more strongly to high particle magnetization.

Figure 1:
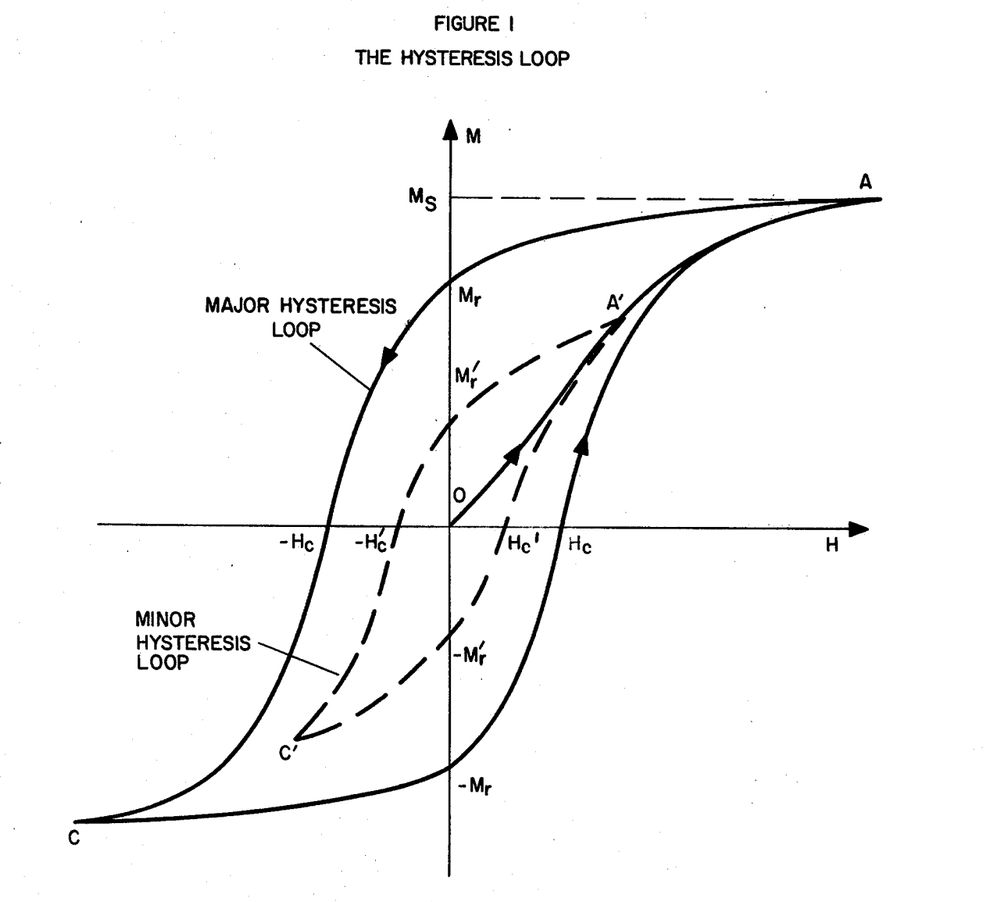
FIG. 1 is a hysteresis loop of a magnetic material.

Each magnetic material is characterized by a hysteresis loop. As is known, hysteresis is defined as the phenomenon exhibited by a system whose state depends on its previous history. The hysteresis loop shows the path which is taken when a ferromagnetic material is placed in an electric field which induces magnetism into the material. From the hysteresis loop can be determined the remanence and the coercivity. The genesis of a hysteresis loop may be described in the following way as shown in FIG. 1.

Figure 2:
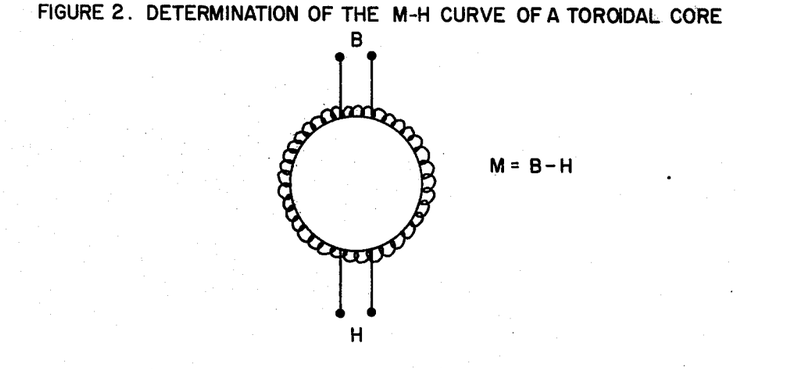
FIG. 2 is a toroidal core with windings.

Consider a toroidal core with windings. Magnetizing current which creates the magnetic force within the toroidal specimen flows in one of the windings. The other is connected to a measuring instrument from which the resulting induction B, may be read (FIG. 2). The magnetization M is then given by $M = B - H$. Starting from O on FIG. 1 which represents an unmagnetized condition, the field strength is gradually increased. M rises gradually until it reaches a constant value $M_s$. This point is called the saturation magnetization. The curve from point O to A is called the virgin curve on FIG. 1. If the magnetizing current is gradually reduced to zero, M does not return to zero but attains a positive value $M_r$ called remanence or residual magnetization $M_r$. This means that the specimen is a permanent magnet and $M_r$ is a measure of its strength. To make M vanish, a negative field strength $-H_c$ must be applied by the magnetizing winding. This is called the coercivity or coercive force, and is a measure of how well a permanent magnet retains its field. If the intensity of the field is further increased in the negative sense a reversed saturation density $-M_s$ is achieved. The curve A, $M_r$ $(-H_c)$ C is called the demagnetization curve. Now if the field strength increases once more in the positive sense, the curve will rise again to the positive saturation density, $M_s$, by a route through $-M_r$ and $H_c$. The curve C $(-M_r)$ $H_cA$ is called the magnetization curve. The hysteresis curve $AM_r(-H_c)$ $C(-M_r)$ $H_cA$ is called the major hysteresis loop.

If instead of saturating the unmagnetized specimen we increase the applied field to point A' and follow the same sequence we obtain the minor hysteresis loop A' $M_r'(-H_c)'$ C' $(-M_r)'$ $H_c'A'$. The residual magnetization and coercivity of the specimen are $M'_r$ and $-H'_c$. Thus, the residual magnetization for a toroidal specimen is given by the intersection of the vertical axis and the demagnetization curve, while its coercivity is given by the intersection of the horizontal axis and the demagnetization curve. For any specimen of finite dimensions other than a toroidally shaped specimen, the coercivity and residual magnetization depend on the demagnetization curve as well as the demagnetization coefficient, d of the specimen. This is so because when a specimen of finite length is placed in a magnetic field, it develops free poles which oppose the applied magnetic field. The demagnetization coefficient is a function of the shape and dimensions of the specimen.

Figure 3:
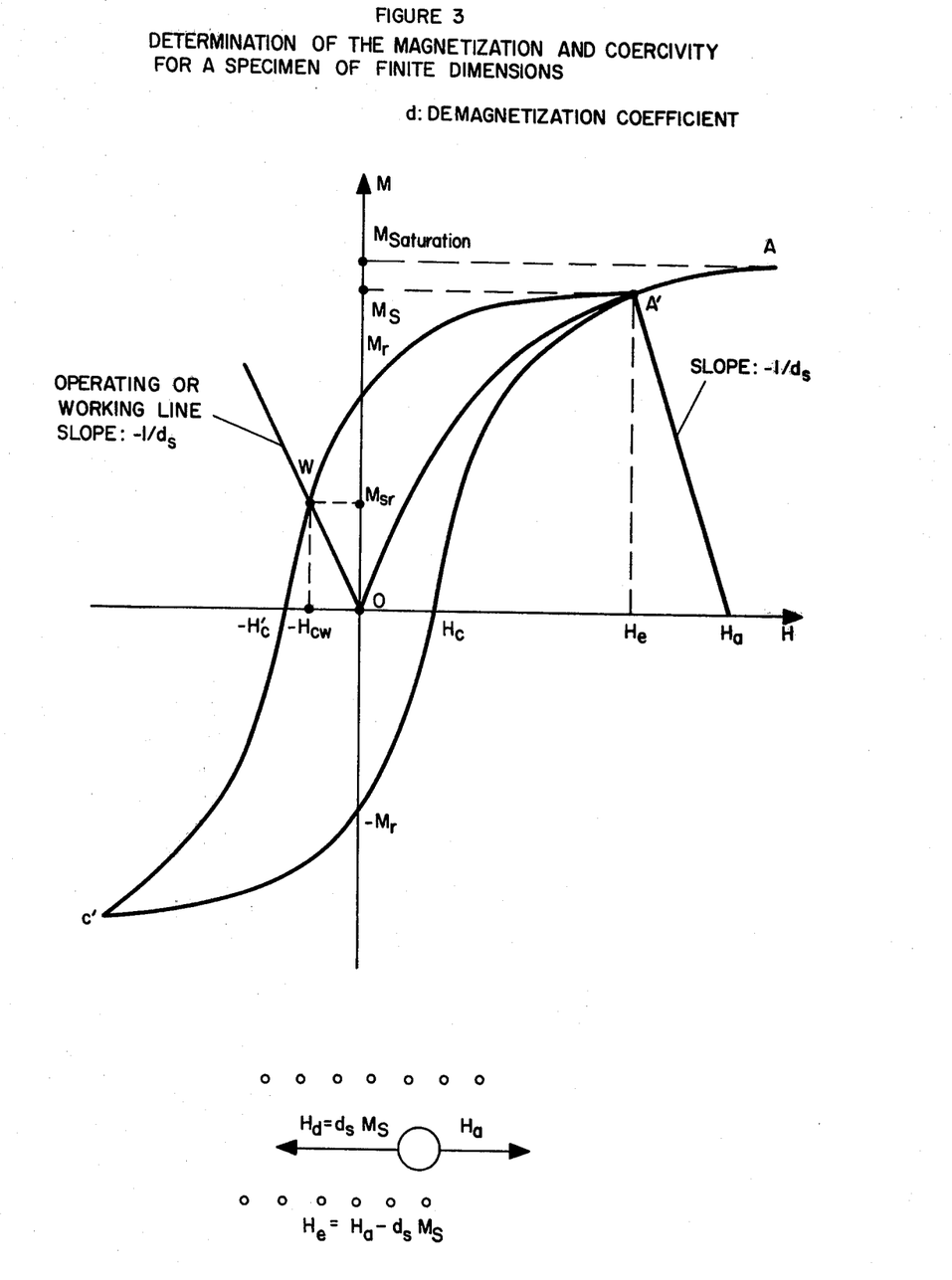
FIG. 3 is a plot of the determination of the magnetization and coercivity for a specimen of finite dimensions.

Consider for example, a spherical ferromagnetic particle placed in a magnetic field of strength $H_a$. The magnetic flux entering the sphere produces a demagnetizing field $H_d$ which opposes the original field $H_a$. The demagnetizing field is given by: $H_d = d_sM_s$ where $M_s$ is the sphere magnetization, and $d_s$ the demagnetization coefficient of the sphere. Thus, the effective magnetic field is given by: $H_e = H_a - d_sM_s$. The sphere magnetization at an applied field $H_a$ is obtained by the intersection of the virgin magnetization curve and the working or operating line $H_aA'$ of slope $-1/d_s$ (FIG. 3). When the applied field is reduced to zero the sphere becomes a permanent magnet. Then, its residual magnetization $M_{sr}$ (working magnetization) and the working coercivity, $H_{cw}$, are given by the intersection of the operating line of the sphere and the demagnetization curve, point W.

Figure 4:
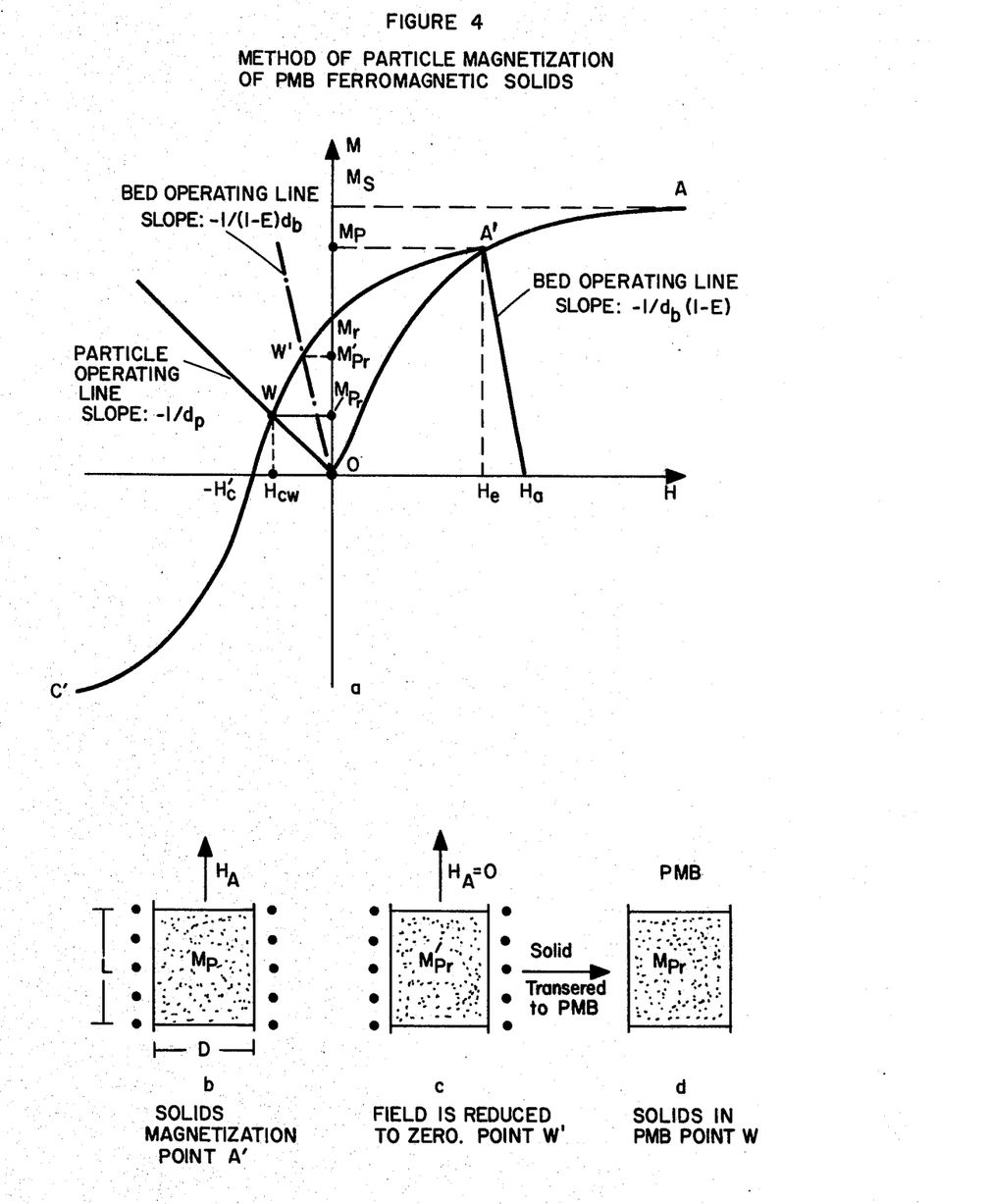
FIG. 4 is a plot of the method of particle magnetization of PMB ferromagnetic solids.

A similar procedure is used to determine the particle residual magnetization of permanently magnetized particle bed (PMB) solids. This is shown in FIG. 4. The ferromagnetic particles are placed in a cylindrical vessel of known dimensions L and D, and are exposed to an axially uniform magnetic field of strength $H_a$. The particle magnetization $M_p$ is given by the intersection of the virgin magnetization curve OA and the bed operating line of slope $1/d_b$ $(1-\epsilon$ Point A'); where $\epsilon$ is the bed void fraction (i.e. the fraction of the total volume which is unoccupied by the magnetic materials) and $d_b$ is the bed demagnetization coefficient which is a function of bed L/D.

If the field is reduced to zero, the residual particle magnetization $M'_{pr}$ is given by the intersection of the demagnetization curve A'C' and the bed operating line (Point W'). When the solids are transferred into the PMB, the particles behave like individual magnets and their magnetization is determined by the intersection of the demagnetization curve and the operating line of slope $-1/d_p$ (point W); where $d_p$ is the demagnetization coefficient of individual particles. For spherical particles $d_p = 1/3$. Thus, for a bed of permanently magnetized ferromagnetic particles the residual particle magnetization is given by extrapolating to the Y axis $M_{pr}$. In a similar manner, the working coercivity is given by extrapolating from point W to the X axis $H_{cw}$.

Figure 5:
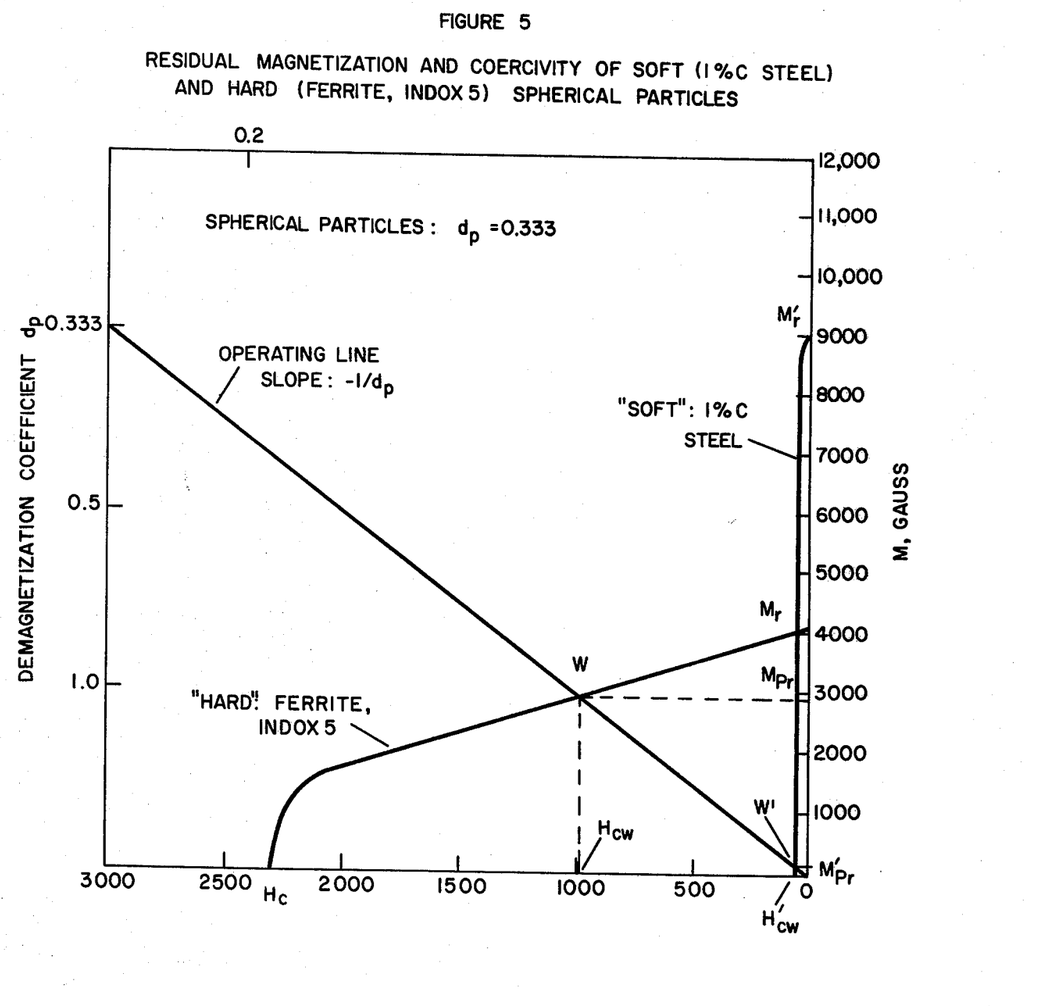
FIG. 5 is a plot of the demagnetization portion of typical demagnetization curves of a soft (1% carbon steel) and a hard material (Ferrite, Indox 5).

The main difference between "soft" and "hard" ferromagnetic materials is their coercivity. This is shown in FIG. 5 which is a plot of the demagnetization portion of typical demagnetization curves of a soft (1% carbon steel) and a hard material (Ferrite, Indox 5). The particle residual magnetization and working coercivity assuming spherical particles is determined by the method described previously. It is seen that the Ferrite has a much higher $M_{pr}$ and $H_c$ (Point W, $M_p$ = 2900 Gauss, $H_c$ — 2300 Oers) than the carbon steel (Point W', $M_p$ = 140 $H_{cw}$ = 50).

Other desirable properties of materials to be used in permanently stabilized fluidized beds are Curie temperature higher than process conditions and chemical stability under process conditions. It is well known that permanently magnetized particles tend to lose their magnetic properties as the temperature is increased. The Curie temperature is defined as the temperature at which permanently magnetized particles cease to exhibit magnetic characteristics. This will be an extremely important consideration in determining the types of materials which will be suitable for a permanently magnetized fluidized bed process. Chemical stability under process conditions refers to the tendency of the material to be oxidized, reduced or undergo some other chemical change, thereby destroying its magnetic properties. Inasmuch as there is a very wide range of applications to which a permanently magnetized fluidized bed may be applied, this property will also be extremely important.

The fluidizable solids which are used in the process of this invention will, in general, include magnetizable substances having a coercivity of at least 50 oersteds. These materials include but are not limited to ferrites of the form $XO.Fe_2O_3$, wherein X is a metal or a mixture of metals such as Mn, Cu, Ba, Sr, etc. ferromagnetic elements including iron, nickel, cobalt and gadolinium precipitation alloys, alnicos, etc. and various types of powder magnets Fe-Co, rare earth Co, etc.

In addition to the aforedescribed magnetizable substances, the fluidizable solids may include one or more materials which is chosen to effect the desired mass transfer or chemical reaction. Accordingly, the fluidizable solids of the invention will generally include a vast number of conventional materials which are known to catalyze the desired reaction, promote drying, effect the desired separation, etc.

Examples of catalysts useful herein include those catalysts conventionally employed in such processes as fluid catalytic cracking, reforming, hydrogenation, hydrocracking, isomerization, alkylation, polymerization, oxidation, etc. Examples of materials for mass transfer useful herein include drying and separating agents such as the well known molecular sieve.

The fluid catalytic cracking catalysts which may be used in the process of the invention, include the highly active zeolite containing catalysts and the amorphous silica alumina catalysts.

In general, the zeolite type catalysts are exemplified by those catalysts wherein a crystalline aluminosilicate is dispersed with a siliceous matrix. Among the well recognized types of zeolites useful herein are the Type A, Type Y, Type X, Type ZSM, mordenite, faujasite, erionite and the like. A further description of these zeolites and their methods of preparation are given, for example, in U.S. Pat. Nos. 2,882,243; 2,882,244; 3,130,007; 3,410,808 and 3,733,390; 3,827,968 and patents mentioned therein, all incorporated herein by reference. Because of their extremely high activity, these zeolite materials are deposited with a material possessing a substantially lower level of catalytic activity such as a siliceous matrix material which may be of the synthetic, semi-synthetic or natural type. The matrix materials may include silica-alumina, silica-gel, silica-magnesia, alumina and clays, such as montmorillonite, kaolin, etc.

The zeolite which is preferably incorporated into the matrix is usually exchanged with various cations to reduce the alkali metal oxide content thereof. In general, the alkali metal oxide content of the zeolite is reduced by ion exchange treatment with solutions of ammonium salt, or salts of metals in Group II to Group VIII of the Periodic Table or the rare earth metals. Examples of suitable cations include hydrogen, ammonium, calcium, magnesium, zinc, nickel, molybdenum and the rare earths such as cerium, lanthanum, praseodymium, neodymium, and mixtures thereof. The catalysts will typically contain 2–25% of the zeolite component and 75–98% of the matrix component. The zeolite will usually be exchanged with sufficient cations to reduce the sodium level of the zeolite to less than 5 wt. %, preferably less than 1 wt. %. Other specific examples of these types of catalysts are found, for example, in U.S. Pat. Nos. 3,140,249; 3,140,251; 3,140,252 and 3,140,253, which are incorporated herein by reference.

When used in hydrotreating or hydrofining reactions the catalyst component will contain a suitable matrix component, such as those mentioned heretofore and one or more hydrogenating components comprising the transition metals, preferably selected from Groups VI and VIII of the Periodic Table. Examples of suitable hydrogenating metals which may be supported upon a suitable matrix include, among others, nickel, cobalt, molybdenum, tungsten, platinum, and palladium, ruthenium, rhenium, iridium (including the oxides and sulfides thereof). Mixtures of any two or more of such hydrogenating components may also be employed. For example, catalyst containing (1) nickel or cobalt, or the combination thereof, in the form of metal, oxide, sulfide or any combination thereof, and (2) molybdenum or tungsten, or the combination thereof, in the form of metal, oxide, sulfide or any combination thereof are known hydrofining catalysts. The total amount of hydrogenating component supported on the matrix may range from 2 to 25 wt. %, calculated as metal, usually 5 to 20 wt. % based on the total weight of the catalyst composition. A typical hydrofining catalyst includes 3 to 8 wt. % CoO and/or NiO and about 8 to 20 wt. % $MoO_3$ and/or $WO_3$ (calculated as metal oxide).

Examples of reforming catalysts which may be used in accordance with the invention are those catalysts comprising a porous solid support and one or more metals (or compounds thereof, e.g. oxides) such as platinum, iridium, rhenium, palladium, etc. The support material can be a natural or synthetically produced inorganic oxide or combination of inorganic oxides.

Typical acidic inorganic oxide supports which can be used are the naturally occurring aluminum silicates, particularly when acid treated to increase the activity and the synthetically produced cracking supports, such as silica-alumina, silica-zirconia, silica-alumina-magnesia and crystalline zeolitic aluminosilicates. Generally, however, reforming processes are preferably conducted in the presence of catalysts having low cracking activity, i.e., catalysts of limited acidity. Hence, preferred carriers are inorganic oxides such as magnesia and alumina. Other examples of suitable reforming catalysts are found in U.S. Pat. Nos. 3,415,737; 3,496,096; 3,537,980; 3,487,009; 3,578,583; 3,507,780 and 3,617,520 which are incorporated herein by reference.

The fluidized bed may comprise substantially 100% of solid particles which are permanently magnetized or may comprise admixtures of magnetizable solids with non-magnetic materials. For example, unmagnetized catalytic particles may be physically admixed with the aforesaid described permanently described particles and the advantages of the present invention can still be obtained. However, it is preferred that the volume fraction of permanently magnetized particles exceed 25%.

The aforedescribed permanently magnetized material may be directly incorporated with the material which is chosen to effect the desired physical or chemical reaction. For example, one or more of the aforedescribed catalytic materials may be impregnated with a soluble precursor of a ferromagnetic substance which is subsequently reduced or oxidized to render the particles ferromagnetic. Alternatively, the ferromagnetic material may be incorporated into the catalyst component by the encapsulation of finely divided ferromagnetic material. The particular method of preparing a fluidizable permanently magnetized solid does not form a part of this invention. The permanently magnetized fluidized particles of the invention will contain 1 to 100 vol. % usually 5 to 30 vol. % (based on the total volume of the particle) of the aforedescribed magnetic material.

The permanently magnetized fluidizable particles which are fluidized in the process of this invention will have a coercivity of at least 50 oersteds, more preferably, 250 oersteds and will range in particle size from 0.01 mm to 5 mm, more preferably from 0.05 mm to 1.0 mm. Particles of dimensions greater than 5 mm will be difficult to fluidize, or particles smaller than 0.01 mm will be difficult to contain in any fluidized process. The size of the ferromagnetic particles used for encapsulation will be from 0.0001 mm to 5 mm and more preferably, from 0.0001 mm to 1.0 mm. In general, the higher the coercivity and the remanence of the particles the higher is their residual magnetization and the higher will be the fluidizing gas velocity which may be employed in the bed without bubbling or entrainment of solids in the fluid leaving the bed. As is known, bubbling is the point at which bubbles first appear in the bed and the height of the bed begins to fluctuate. Significant entrainment is the point where unacceptable quantities of solids are stripped from the fluidizing medium and are carried from the bed region. In other words, coercivity and residual magnetization determine the stability of the bed and sets the operable velocity range for the particles of a given size.

The process conditions to be employed in the practice of the present invention will, of course, vary with the particular physical operation or conversion reaction desired. Process conditions and the nature of the conversion reaction will also determine the particular permanently magnetized material to be used. As previously mentioned, temperature has a marked effect on the tendency of a given material to retain its magnetic properties. Therefore, in processes which require relatively high temperatures, materials having relatively high Curie temperatures must be used in order to maintain the magnetic properties which impart stability to the bed. Another important consideration is chemical stability of the particular material under process conditions. Tables I and II summarize typical reaction conditions and important magnetic properties of commercially available permanent magnetic materials which may be used in accordance with the present invention.

The feedstocks suitable for conversion in accordance with the invention include any of the well-known feeds conventionally employed in hydrocarbon conversion processes. Usually, they will be petroleum derived, although other sources such as shale oil and coal are not to be excluded. Typical of such feeds are heavy and light virgin gas oils, heavy and light virgin naphthas, solvent extracted gas oils, coker gas oils, steam-cracked gas oils, middle distillates, steam-cracked naphthas, coker naphthas, cycle oils, deasphalted residua, etc.

The process is not limited to any particular vessel material and it can be readily adapted for use in reactors currently employed by industry.

DESCRIPTION OF THE PREFERRED EMBODIMENTS

The following examples were carried out for the purpose of determining the increase in fluidizing gas velocity obtainable from $U_o$, the minimum superficial gas velocity, to $U_t$, the transition velocity, for unmagnetized particles as compared with the increase obtainable for magnetized particles. As is generally known, the minimum superficial gas velocity required to fluidize the bed is that superficial gas velocity required to transform the bed of particles at rest, i.e. a fixed bed, to a bed in the fluidized state, i.e. a fluidized bed. In general, this minimum fluidization superficial gas velocity is the gas velocity observed when the pressure difference of the gas passing through the fluidized bed, as measured between upper and lower surfaces of the bed, is first substantially the same as the bed weight per cross-sectional area. As is well known, superficial gas velocity is a measure of the linear gas velocity that would pass through an empty vessel and it is measured in feet per second, centimeter per second, etc. Transition velocity is the fluidizing gas velocity at which bubbles first begin to appear and the bed height begins to fluctuate. Another object was to compare the increases obtainable for various materials to determine which materials gave the most satisfactory results in imparting stability to a fluidized bed.

TABLE I

| Principal Conversion Desired | Reaction Conditions | | | |
|---|---|---|---|---|
| | Temp. °F. | Pressure, psig | Feed Rate V/V/Hr. | Hydrogen Rate scf/bbl |
| Hydrofining | 500-800 | 50-2,000 | 0.1-10.0 | 500-10,000 |
| Hydrocracking | 450-850 | 200-2,000 | 0.1-10.0 | 500-10,000 |
| Cataytic Cracking | 700-1,000 | 0-50 | 0.1-20.0 | 0 |
| Catalytic Reforming | 850-1,000 | 50-1,000 | 0.1-20.0 | 500-10,000 |

TABLE II
PROPERTIES OF PERMANENT MAGNET MATERIALS

| Materials | Abbreviated Name | ρp Particle Density g/cm³ | B Remanence Gauss | Hc Coercivity Oer | Tc °C |
|---|---|---|---|---|---|
| Magnet Steels | 35% Co | 8.2 | 9000 | 250 | 890 |
|  | 2% Co | 7.8 | 9800 | 80 | 775 |
|  | 36% Fe Co | 8.6 | 10400 | 270 | — |
| Precipitation Alloys | Alnico's | 6.9 – 7.4 | 5500–14000 | 450–1450 | 750–850 |
| Powder Magnets | Gecolloy 4 (Fe Powder) | 4 – 5 | 9000 | 340 | 980 |
|  | Fe-Co |  | 6000–9000 | 350–620 |  |
|  | Lodex 41 (Co, Pb, Fe, Sb) | 9.9 | 4300 | 1000 | 980 |
|  | Rare-earth-Co | 8 | 7700–12000 | 2600–9000 | 600–850 |
| Ferrites (Ceramic) | Ba, Sr, Ferrites | 3–5 | 1600–4100 | 1800–3300 | 450 |

APPARATUS

A 2 and 3 inch internal diameter by 24 inch high plexiglas fluidized bed unit supplied with a porcelain porous plate distributor were employed in all runs. Rotameters and valves were used to control and measure gas flow rates. The gas inlet means was attached to the bottom of the fluid bed apparatus. The fluid bed apparatus was arranged in a vertical position.

MATERIALS

The fluidizing gas was air at ambient conditions. The solids were steel shot, reduced iron ore Indox 5 (92% Fe, 8% FeO$_x$), sintered ferrite (barium ferrite — Ba 0.6 Fe$_2$O$_3$). Alnico 5 (14% Ni, 8% Al, 24% Co, 3.2% Ca, 50.8% Fe), and composite ceramic/wax (11.4 vol %, Ba 0.6 Fe$_2$O$_3$, 88.6 vol % wax), (11 vol Vol % Ba 0.6 Fe$_2$O$_3$, 89 vol % AlSi). Unmagnetized steel shot, 92% Fe/8% FeO$_x$ solids, and 14% Ni, 8% Al, 24% Co, 3.2% Cu, 50.8% Fe Alnicos were sieved to desirable size cuts. Large pieces of ferrite magnets were crushed and sieved to a narrow size cut. The wax composite particles were prepared by suspending finely ground ferrite powder (less than 44 mm) and molten Carnuba wax. After cooling to ambient temperature, the resulting odd shape and size composite particles were crushed in a ball mill and sieved. The ferrite/Al-Si composite particles were prepared by spray drying of a suspension of Al-Si gel and ferrite powder.

PREPARATION OF MAGNETIC PARTICLES

Known quantities of solids tightly packed in a 1.5 inch inner diameter by 5.5 inch long plexiglas cylinder were magnetized by exposure to a transverse electromagnetic field generated by a Magnetometer. In another set of runs the particles were magnetized in a fluidized bed by applying an axial magnetic field. A Gauss meter was used to measure the applied field.

ESTIMATION OF PARTICLE MAGNETIZATION AND COERCIVITY

Figure 6:
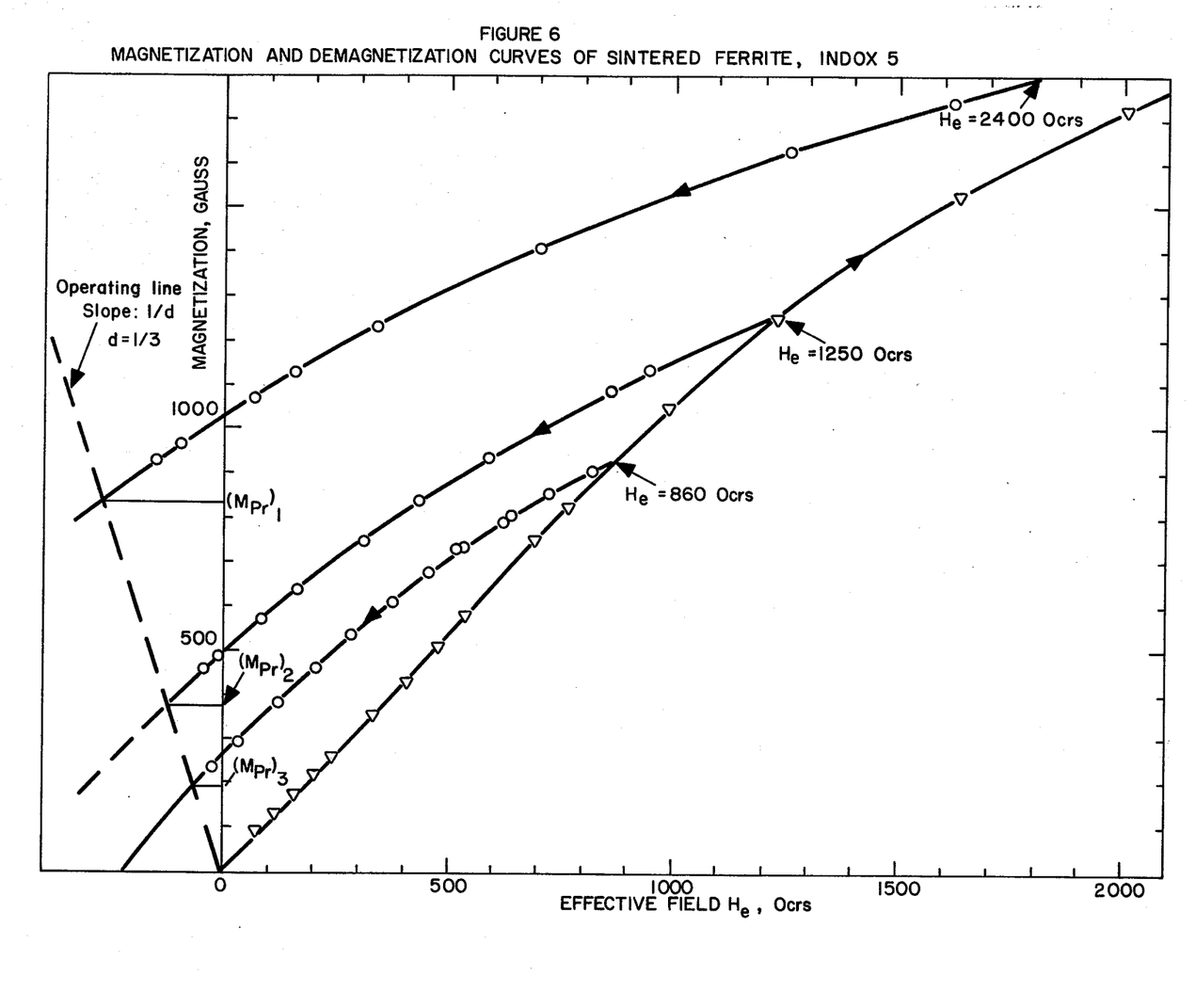
FIG. 6 is a plot of the magnetization and demagnetization curves of sintered ferrite, Indox 5.

Particle magnetization $M_p$ and coercivity $H_c$ was estimated from the hysteresis curves of the materials under consideration and the transverse field demagnetization coefficient of the plexiglas cylinder. FIG. 6 shows the magnetization curve and the demagnetization curves of sintered ceramic particles for three peak magnetizing fields, $H_e$ of 860, 1250 and 2400 oersteds. Assuming spherical particles, the interception of the demagnetization curve and the operating line of slope 1/d = 3 shown in the same figure determines particle magnetization $M_{pr}$. Coercivity $H_c$ is determined from the interception of the demagnetization curve and the horizontal axis as indicated in FIG. 5.

PROCEDURE

Narrow cuts of unmagnetized solid were weighed, placed in the fluidization unit and the pressure drop and bed expansion were measured as a function of air flow rate. From this the minimum fluidization velocity and bed pressure drop at minimum fluidization were determined. After the solids were removed from the bed they were placed in a plexiglas cylinder, packed tightly to a known voidage and magnetized by exposing them to a transverse magnetic field of known intensity. In some runs, the particles were placed in a fluidized bed and they were magnetized by application of an axial magnetic field. The magnetized solids were placed in the fluidization unit and the pressure drop, expansion and velocity at which bubbling first appeared were measured.

Table III summarizes the results of 17 different runs which were carried out to measure the increase in transition velocity obtainable based on various particle characteristics and method of magnetization. The highest bed expansion of 35% was achieved with 80 microns 92% Fe 8% FeO$_x$ particles at a transition velocity 7.6 times the minimum fluidization velocity (Run 3). The maximum transition velocity of 108 cm/sec (11 times the minimum fluidization velocity) was recorded with 300 micron sintered ferrite particles (Run 13).

Increasing particle size resulted in less stable beds with lower expansion and smaller transition to minimum fluidization velocity ratios, illustrated by runs 3, 4 and 5. However, the transition velocity of large particles was higher than that of small particles. Particle density also had a similar though weaker effect on bed stability illustrated by runs 2 and 9. Increasing particle magnetization increased bed stability (runs 5 and 7, 11 and 12, 14 and 15). For the same particle characteristics and approximately the same particle magnetization transition velocities were higher when the particles were magnetized in a fluidized bed with axial field than when they were magnetized in a packed bed with a transveric field (Runs 6, 7, 8 and 11, 12, 13). The marked increase in transition velocity illustrated by runs 6 and 7 shows a clear relationship between an increased transition velocity and higher coercivity. The following example further illustrates the claimd invention.

EXAMPLE 1

1430 grams of Ba 0.6 Fe$_2$O$_3$ was charged into an open top cylindrical plexiglas fluidization chamber having an inner diameter of 3 inches and a height of 24 inches above porous porcelain plate (Run 27-4). The gas density $\pi_p$ in grams per cubic centimeter were 5.0. The bed voidage $\epsilon_o$ was 0.598. The superficial velocity for the unmagnetized particles $U_o$ was 6.1 centimeters per second. When these particles were magnetized in the aforedescribed manner, the following physical measurements were obtained. The ferrite particles were magnetized to a magnetization ($M_p$) 480 Gauss by subjecting them to an applied magnetic field ($H_a$) of 1420 Oersteds. Under these conditions a bed height ($L_{om}$) of 18.0 centimeters was attained. The bed voidage at incipient fluidization ($\epsilon_{om}$) of 0.651 was obtained. The superficial gas velocity at incipient fluidization $U_{om}$ 27.97 centimeters per second was obtained. The bed expansion (e) of 1.14 was attained. A bed voidage ($\epsilon_t$) of 0.693 was attained. A superficial gas velocity at transition ($U_t$) of 67.3 centimeters per second was attained. The ratio of superficial gas velocity at transition to superficial gas velocity at incipient fluidization $U_t/U_o$ of 11 was obtained. Table III shows the aforedescribed physical characteristics of magnetized and unmagnetized particles for all runs. The $U_t/U_o$ obtained in each case was for a substantially non-bubbling bed which is defined as a bed where fluctuations in bed height are 1% or less.

What is claimed is:

1. A fluidized bed process operated in the absence of an externally applied magnetic field which comprises passing a fluidizing gas upwardly through a substantially non-bubbling bed of fluidizable permanently magnetized particles at a velocity of at least twice the minimum fluidizing gas velocity required to fluidize the bed, said permanently magnetized particles having a coercivity of at least 50 oersteds.

2. The process of claim 1 wherein said fluidizable permanently magnetized particles have a coercivity of at least 150 oersteds.

3. The process of claim 1 wherein said fluidizable permanently magnetized particles have a coercivity of at least 250 oersteds.

4. The process of claim 1 wherein said fluidizable permanently magnetized particles are selected from the group comprising ferrites, reduced iron ore, Carnuba wax/ ferrite composites, Alnico magnets, Al-Si ferrite composites, rare earth/Co alloys, single domain Fe and Fe-Co particles.

5. The process of claim 1 wherein said fluidizable permanently magnetized particles have a particle diameter of .05 to 1.0 mm.

6. The process of claim 1 wherein said fluidizable permanently magnetized particles have a Curie temperature of at least 300° C.

7. The process of claim 1 wherein said fluidizing gas is passed upwardly through a substantially non-bubbling bed of fluidizable permanently magnetized particles at a velocity of at least 5 times the minimum fluidizing gas velocity required to fluidize said bed.

8. The process of claim 1 wherein said fluidizing gas is passed upwardly through a substantially non-bubbling bed of fluidizable permanently magnetized particles at a velocity of at least 10 times the minimum fluidizing gas velocity required to fluidize said bed.

TABLE III

FLUIDIZATION CHARACTERISTICS OF MAGNETIC PARTICLES

| Material | Run No. | $d_p$ μm | Size Range μm | ρp g/cm³ | $u_o$ cm/sec (Unmagnetized) | $\epsilon_0$ (Unmagnetized) | Hc (Magnetized) | $M_{pr}$ Gauss (Magnetized) | $H_A$ Oers. (Magnetized) |
|---|---|---|---|---|---|---|---|---|---|
| Steel Shot | 1 | 150 | 105–180 | 7.8 | 11.5 | 0.65 | 50 | 150 | 15100 |
| Steel Shot | 2 | 220 | 180–250 | 7.8 | 19.8 | 0.62 | 50 | 150 | 15100 |
| Reduced Iron Ore (FIOR) | 3 | 80 | 44–105 | 4.8 | 0.6 | 0.42 | 30 | 95 | 15100 |
| Reduced Iron Ore (FIOR) | 4 | 150 | 105–180 | 4.8 | 2.4 | 0.44 | 30 | 95 | 15100 |
| Reduced Iron Ore (FIOR) | 5 | 220 | 180–250 | 4.8 | 6.7 | 0.44 | 30 | 95 | 15100 |
| Ferrite, Indox 5 | 6 | 220 | 180–250 | 5 | 6.4 | 0.54 | 130 | 140 | 1000 |
| Ferrite, Indox 5 | 7 | 220 | 180–250 | 5 | 6.5 | 0.54 | 520 | 470 | 1700 |
| Ferrite, Indox 5 | 8 | 310 | 250–355 | 5 | 12.0 | 0.53 | 530 | 480 | 1700 |
| Ferrite Composites 11.4 Vol % in Wax | 9 | 220 | 180–250 | 1.5 | 1.8 | 0.53 | 150 | 160 | 4000 |
| Ferrite Composites 11.4 Vol % in Wax | 10 | 310 | 250–355 | 1.5 | 4.6 | 0.53 | 260 | 240 | 10000 |
| Ferrite, Indox 5 | 11 | 200 | 180–250 | 5 | 6.1 | 0.598 | 160 | 140 | 780 |
| Ferrite, Indox 5 | 12 | 200 | 180–250 | 5 | 6.1 | 0.598 | 570 | 480 | 1420 |
| Ferrite, Indox 5 | 13 | 300 | 250–355 | 5 | 12.0 | 0.560 | 570 | 480 | 1420 |
| Ferrite Composites 11 Vol % in Al-Si | 14 | 205 | 105–355 | 1.45 | 2.8 | 0.585 | 140 | 165 | 4000 |
| Ferrite Composites 11 Vol % in Al-Si | 15 | 205 | 105–355 | 1.45 | 2.8 | 0.585 | 210 | 260 | 6000 |
| Alnico 5 | 16 | 165 | 105–250 | 7.62 | 10.1 | 0.573 | 100 | 180 | 400 |
| Alnico 5 | 17 | 165 | 105–250 | 7.62 | 10.1 | 0.573 | 205 | 400 | 550 |

| Material | Run No. | $\epsilon_{om}$ cm | $\epsilon_{om}$ | $u_{om}$ cm/sec | e Expansion | $\epsilon_t$ | $u_t$ cm/sec | $u_t/u_o$ | Method of Magnetiziation |
|---|---|---|---|---|---|---|---|---|---|
| Steel Shot | 1 | 16.8 | 0.69 | 14.5 | 1.12 | 0.72 | 21.6 | 1.9 | Fixed Bed/Transverse |
| Steel Shot | 2 | 17.4 | 0.66 | 26.5 | 1.12 | 0.70 | 41.2 | 2.1 | Field |
| Reduced Iron Ore (FIOR) | 3 | 16.0 | 0.44 | 1.35 | 1.0 | 0.59 | 4.9 | 7.6 | Field |
| Reduced Iron Ore (FIOR) | 4 | 16.1 | 0.46 | 3.4 | 1.20 | 0.55 | 10.4 | 4.3 | Field |
| Reduced Iron Ore (FIOR) | 5 | 18.8 | 0.49 | 8.8 | 1.16 | 0.55 | 17.7 | 2.5 | Field |
| Ferrite, Indox 5 | 6 | 19.1 | 0.55 | 7.9 | 1.15 | 0.61 | 17.7 | 2.8 | Field |
| Ferrite, Indox 5 | 7 | 18.0 | 0.59 | 11.6 | 1.27 | 0.68 | 39.0 | 6.1 | Field |
| Ferrite, Indox 5 | 8 | 19.3 | 0.58 | 24.3 | 1.17 | 0.64 | 49.0 (55.0)* | 4.1 (4.7)* | Field |
| Ferrite Composites 11.4 Vol % in Wax | 9 | 18.3 | 0.55 | 2.5 | 1.22 | 0.64 | 8.0 | 4.4 | Field |
| Ferrite Composites 11.4 Vol % in Wax | 10 | 19.3 | 0.55 | 8.5 | 1.17 | 0.62 | 18.9 | 4.1 | Field |
| Ferrite, Indox 5 | 11 | — | — | — | 1.21 | 0.721 | 43.8 | 7.2 | Fluid Bed/Axial |
| Ferrite, Indox 5 | 12 | 18.0 | 0.651 | 27.9 | 1.14 | 0.693 | 67.3 | 11.0 | Field |
| Ferrite, Indox 5 | 13 | — | — | — | 1.22 | 0.756 | 108.0 | 9.0 | Field |
| Ferrite Composites 11 Vol % in Al-Si | 14 | 19.6 | 0.663 | 6.6 | 1.18 | 0.717 | 15.4 | 5.5 | Field |
| Ferrite Composites 11 Vol % in Al-Si | 15 | — | — | — | 1.33 | 0.750 | 22.3 | 8.0 | Field |
| Alnico 5 | 16 | — | — | — | 1.11 | 0.689 | 31.4 | 3.1 | Field |
| Alnico 5 | 17 | — | — | — | 1.17 | 0.704 | 43.1 | 4.3 | Field |

*After stirring